(12) United States Patent
Gailey et al.

(10) Patent No.: US 11,852,255 B2
(45) Date of Patent: Dec. 26, 2023

(54) COMBINATION REGULATOR FOR CRYOGENIC TANKS

(71) Applicant: Lincoln Global, Inc., Santa Fe Springs, CA (US)

(72) Inventors: David W. Gailey, Lula, GA (US); Randy C. Edenfield, Lula, GA (US)

(73) Assignee: Lincoln Global, Inc., Santa Fe Springs, CA (US)

( * ) Notice: Subject to any disclaimer, the term of this patent is extended or adjusted under 35 U.S.C. 154(b) by 196 days.

(21) Appl. No.: 17/386,012

(22) Filed: Jul. 27, 2021

(65) Prior Publication Data

US 2022/0282798 A1    Sep. 8, 2022

Related U.S. Application Data

(60) Provisional application No. 63/155,848, filed on Mar. 3, 2021.

(51) Int. Cl.
*F16K 17/04*      (2006.01)
*F17C 13/04*      (2006.01)
(Continued)

(52) U.S. Cl.
CPC ........ *F16K 17/0453* (2013.01); *F16K 17/048* (2013.01); *F17C 13/04* (2013.01);
(Continued)

(58) Field of Classification Search
CPC .............. F17C 13/04; F17C 2205/0338; F17C 2223/0161; F16K 17/048; F16K 17/0453; G05D 16/0683; G05D 16/0402
See application file for complete search history.

(56) References Cited

U.S. PATENT DOCUMENTS 3,495,625 A    2/1970  Shuttleworth et al.
3,804,056 A    4/1974  Lee et al.
(Continued)

FOREIGN PATENT DOCUMENTS

DE    298 02 433 U1    9/1998
EP       0994291 A2    4/2000
(Continued)

OTHER PUBLICATIONS

Extended European Search Report for Corresponding Application No. 22159204.1; dated Aug. 26, 2022; pp. 1-8.

*Primary Examiner* — Jessica Cahill
(74) *Attorney, Agent, or Firm* — Brad C. Spencer

(57) ABSTRACT

A combination pressure regulator includes a regulator body having an inlet port, an outlet port, and a combined inlet and outlet port. A first pressure regulator includes a first diaphragm, a first valve assembly, and a first biasing member that applies a first bias force to the first diaphragm to establish a first pressure regulator setting. A second pressure regulator includes a second diaphragm, a second valve assembly, and a second biasing member that applies a second bias force to the second diaphragm to establish a second pressure regulator setting. An input portion of the first pressure regulator is in fluid communication with the inlet port. An output portion of the second pressure regulator is in fluid communication with the outlet port. An output portion of the first pressure regulator and an input portion of the second pressure regulator are in fluid communication with the combined inlet and outlet port.

19 Claims, 4 Drawing Sheets

(51) Int. Cl.
　　　*G05D 16/04*　　　(2006.01)
　　　*G05D 16/06*　　　(2006.01)
(52) U.S. Cl.
　　　CPC .. *G05D 16/0402* (2019.01); *F17C 2205/0338* (2013.01); *F17C 2223/0161* (2013.01); *G05D 16/0683* (2013.01)

(56) References Cited

U.S. PATENT DOCUMENTS

| | | | |
|---|---|---|---|
| 3,908,871 A | 9/1975 | Gottwald | |
| 4,624,277 A * | 11/1986 | Veite | G05D 16/0619 137/505.11 |
| 5,829,472 A | 11/1998 | Greenwood et al. | |
| 10,352,502 B2 * | 7/2019 | Rado | G05D 16/2097 |
| 2001/0052360 A1 | 12/2001 | Bryselbout | |
| 2002/0148530 A1 | 10/2002 | Caparros | |
| 2004/0040600 A1 | 3/2004 | Cavagna | |
| 2010/0006787 A1 * | 1/2010 | Nakata | F16L 19/025 251/12 |
| 2011/0061742 A1 * | 3/2011 | Osteen | F17C 13/04 137/613 |
| 2016/0216715 A1 * | 7/2016 | Lapena-Rey | G05D 16/103 |

FOREIGN PATENT DOCUMENTS

| | | |
|---|---|---|
| EP | 1 703 354 B1 | 5/2009 |
| FR | 1562104 A | 4/1969 |
| JP | 50-145714 A2 | 11/1975 |
| JP | 2005-016709 A | 1/2005 |
| JP | 2006-107039 A | 4/2006 |
| JP | 2009-041549 A | 2/2009 |

* cited by examiner

COMBINATION REGULATOR FOR CRYOGENIC TANKS

CROSS-REFERENCE TO RELATED APPLICATIONS

The present application claims priority to U.S. Provisional Patent Application Ser. No. 63/155,848 filed on Mar. 3, 2021, the disclosure of which is incorporated herein by reference.

BACKGROUND OF THE INVENTION

Field of the Invention

The present invention relates to pressure regulators or pressure regulating control valves, and in particular pressure regulators for cryogenic tanks.

Description of Related Art

The present disclosure concerns regulators for cryogenic cylinders or liquid dewars. Liquid dewars are cylinders designed to contain a liquefied gas, vaporize the liquid and safely control the output pressure and flow to a downstream process. These containers are uniquely designed to keep cryogenic gases such as nitrogen, oxygen and carbon dioxide in the liquid state as long as possible. There are hazards associated with cryogenic gases such as low temperatures and the possibility that the cryogenic gases could be exposed to ambient temperatures, which will cause flashing resulting in extremely high pressures in a closed system. Because of the inherent dangers associated with cryogenics, these cylinders utilize a significant amount of hardware, valves and regulators to safely handle the gas. The presence of such hardware can clutter a portion of the cylinder, such as the top of the cylinder.

Currently liquid dewars utilize three different regulators: a pressure building regulator, back pressure regulators, commonly called economizer regulators and final line regulators which control the output pressure to the downstream process. It would be desirable to combine some of the regulators into a single body, which will reduce the hardware footprint, reduce the amount of hardware used, and also reduce the overall cost of the cylinders.

BRIEF SUMMARY OF THE INVENTION

The following summary presents a simplified summary in order to provide a basic understanding of some aspects of the devices, systems and/or methods discussed herein. This summary is not an extensive overview of the devices, systems and/or methods discussed herein. It is not intended to identify critical elements or to delineate the scope of such devices, systems and/or methods. Its sole purpose is to present some concepts in a simplified form as a prelude to the more detailed description that is presented later.

In accordance with one aspect of the present invention, provided is a combination pressure regulator. The combination pressure regulator includes a regulator body having an inlet port on an exterior surface of the regulator body, an outlet port on the exterior surface of the regulator body, and a combined inlet and outlet port on the exterior surface of the regulator body. The combination pressure regulator has a first pressure regulator including a first diaphragm, a first valve assembly movable by the first diaphragm, and a first biasing member that applies a first bias force to the first diaphragm to establish a first pressure regulator setting. The combination pressure regulator has a second pressure regulator including a second diaphragm, a second valve assembly movable by the second diaphragm, and a second biasing member that applies a second bias force to the second diaphragm to establish a second pressure regulator setting different from the first pressure regulator setting. An input portion of the first pressure regulator is in fluid communication with the inlet port. An output portion of the second pressure regulator is in fluid communication with the outlet port. Both of an output portion of the first pressure regulator and an input portion of the second pressure regulator are in fluid communication with the combined inlet and outlet port.

In accordance with another aspect of the present invention, provided is a combination pressure regulator. The combination pressure regulator includes a regulator body having an inlet port, an outlet port, and a combined inlet and outlet port spaced along an exterior surface of the regulator body. The combination pressure regulator has a first pressure regulator including a first diaphragm, a first valve assembly attached to the first diaphragm, and a first biasing member that applies a first bias force to the first diaphragm to establish a first pressure regulator setting. The combination pressure regulator has a second pressure regulator including a second diaphragm, a second valve assembly attached to the second diaphragm, and a second biasing member that applies a second bias force to the second diaphragm to establish a second pressure regulator setting different from the first pressure regulator setting. An input portion of the first pressure regulator is in fluid communication with the inlet port, and an output portion of the second pressure regulator is in fluid communication with the outlet port. An output portion of the first pressure regulator is in fluid communication with an input portion of the second pressure regulator within the regulator body.

In accordance with another aspect of the present invention, provided is a combination pressure regulator. The combination pressure regulator includes a regulator body having an inlet port, an outlet port, and a combined inlet and outlet port spaced along an exterior surface of the regulator body. The combination pressure regulator has a first pressure regulator including a first diaphragm, a first valve assembly movable by the first diaphragm, and a first biasing member that applies a first bias force to the first diaphragm to establish a first pressure regulator setting. The combination pressure regulator has a second pressure regulator including a second diaphragm, a second valve assembly movable by the second diaphragm, and a second biasing member that applies a second bias force to the second diaphragm to establish a second pressure regulator setting different from the first pressure regulator setting. The regulator body further includes a first internal fluid channel connecting an input portion of the first pressure regulator to the inlet port, a second internal fluid channel connecting an output portion of the second pressure regulator to the outlet port, a third internal fluid channel connecting an output portion of the first pressure regulator to the combined inlet and outlet port, and a fourth internal fluid channel connecting an input portion of the second pressure regulator to the combined inlet and outlet port.

BRIEF DESCRIPTION OF THE DRAWINGS

The foregoing and other aspects of the invention will become apparent to those skilled in the art to which the invention relates upon reading the following description with reference to the accompanying drawings, in which.

DETAILED DESCRIPTION OF THE INVENTION

Figure 1:
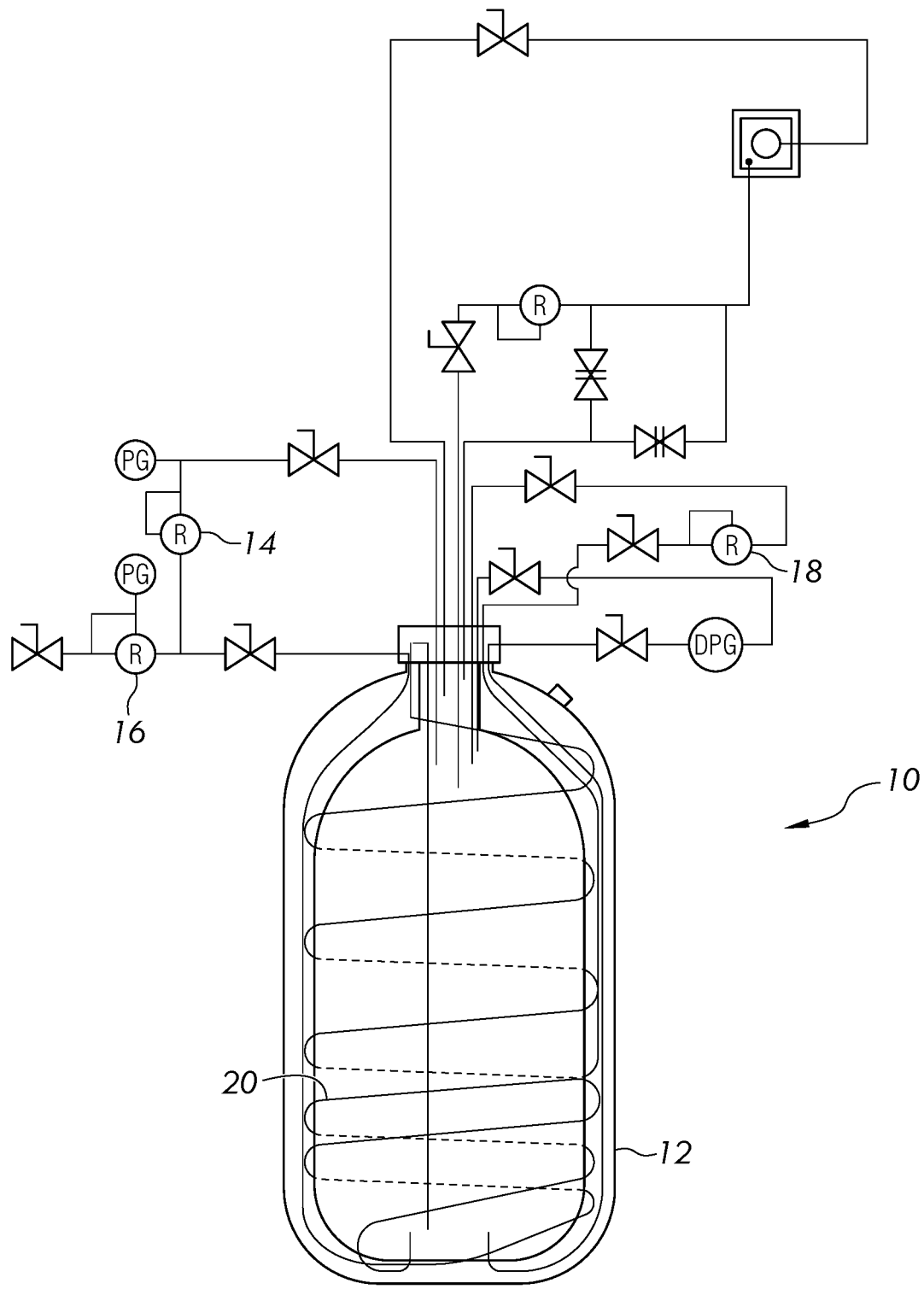
FIG. 1 shows a schematic diagram of an example bulk CO2 storage system.

The present invention relates to pressure regulators for cryogenic tanks. The present invention will now be described with reference to the drawings, wherein like reference numerals are used to refer to like elements throughout. It is to be appreciated that the various drawings are not necessarily drawn to scale from one figure to another nor inside a given figure, and in particular that the size of the components are arbitrarily drawn for facilitating the understanding of the drawings. In the following description, for purposes of explanation, numerous specific details are set forth in order to provide a thorough understanding of the present invention. It may be evident, however, that the present invention can be practiced without these specific details. Additionally, other embodiments of the invention are possible and the invention is capable of being practiced and carried out in ways other than as described. The terminology and phraseology used in describing the invention is employed for the purpose of promoting an understanding of the invention and should not be taken as limiting.

As used herein, "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together. Any disjunctive word or phrase presenting two or more alternative terms, whether in the description of embodiments, claims, or drawings, should be understood to contemplate the possibilities of including one of the terms, either of the terms, or both terms. For example, the phrase "A or B" should be understood to include the possibilities of "A" or "B" or "A and B."

FIG. 1 is a schematic diagram of an example conventional bulk CO2 storage system 10. The system 10 includes an insulated tank 12 or cylinder and various regulators and valves. In particular, the system 10 utilizes each of an economizer regulator 14, a final line regulator 16, and a pressure building regulator 18. The pressure building regulator 18 sets and controls the pressure in the vapor space, or head pressure, above the liquid inside of the cylinder. The head pressure allows gas to be withdrawn from the cylinder through the final line regulator 16. The pressure building regulator 18 receives liquid and/or gas via a pressure building coil 20. Liquid from the bottom of the cylinder flows through and is vaporized in the pressure building coil 20. The pressure building regulator 18 discharges gas to the vapor space of the cylinder and regulates the pressure of the vapor space. The final line regulator 16 regulates the pressure of the gas that is discharged to a downstream process that uses the gas. In the conventional bulk CO2 storage system 10 shown, the pressure building regulator 18 and final line regulator 16 are separate devices mounted to the cylinder, and have their own valve bodies and pressure control hardware.

Figure 2:
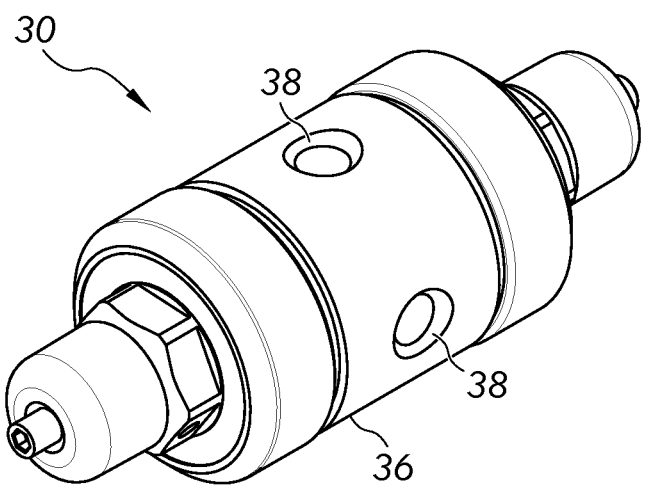
FIG. 2 is a perspective view of a combination pressure building regulator and final line regulator.
Figure 3:
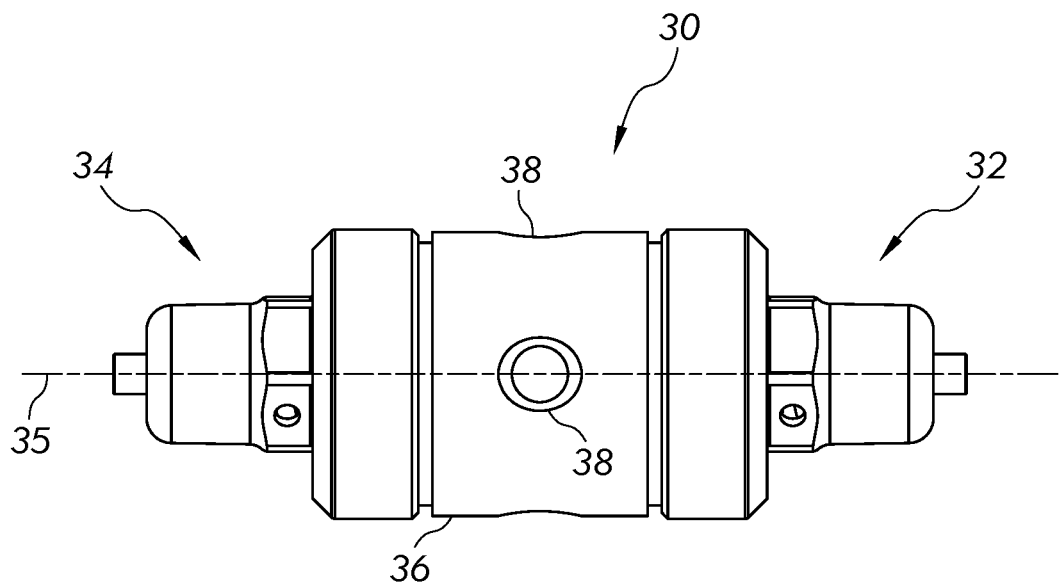
FIG. 3 is a side view of the combination pressure building regulator and final line regulator.
Figure 4:
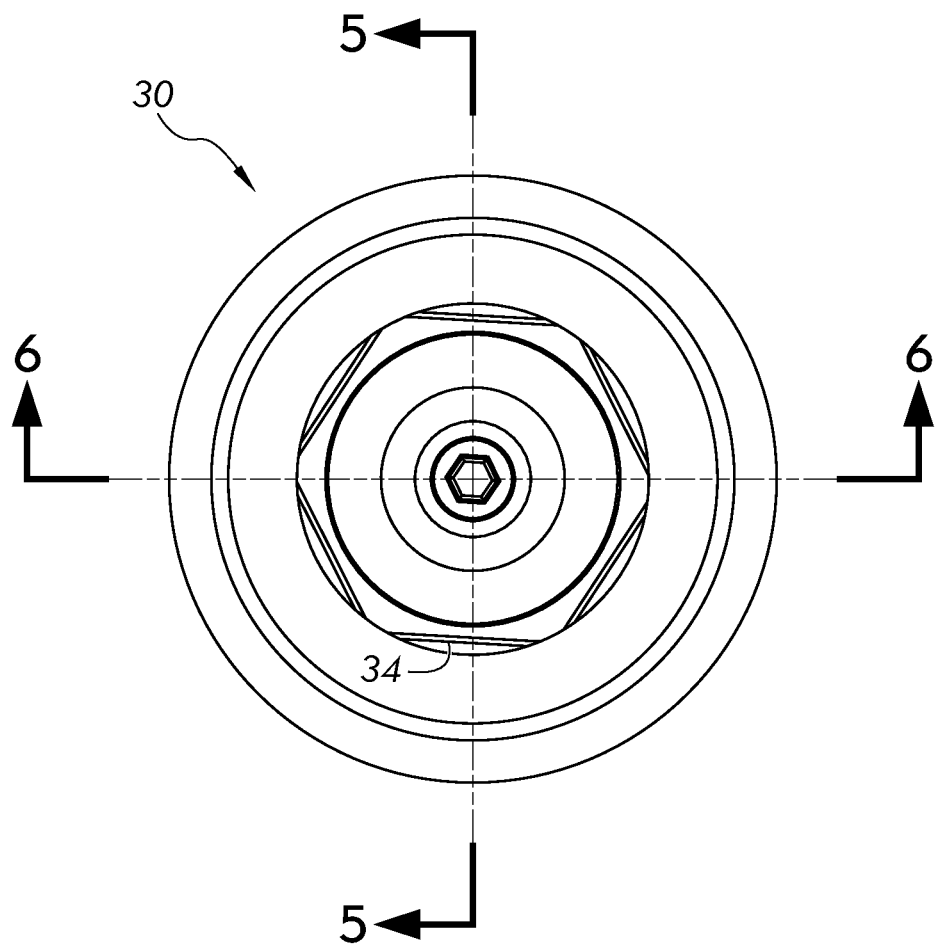
FIG. 4 is an end view of the combination pressure building regulator and final line regulator.

The present invention combines the pressure building regulator and final line regulator into a single device having a common regulator body and two separate regulators at opposite ends of the body. FIGS. 2 through 4 are exterior views of an example combination pressure building regulator and final line regulator 30. The pressure building and final line regulators are combined into a single body, which reduces the number of devices connected to the cryogenic cylinder. The pressure building regulator 32 is located at one axial side of the combination regulator 30, and the final line regulator 34 is located at an opposite axial side of the combination regulator. In the embodiment shown, the pressure building regulator 32 is axially aligned with the final line regulator 34 along an axis 35 of the regulator body 36. However, other configurations are possible and the regulators 32, 34 need not be axially aligned as shown. The body 36 of the combination regulator 30 includes a number of ports 38 arranged symmetrically around the circumference of the body 36 (e.g., spaced 90 degrees apart). In the embodiment shown, the combination regulator 30 includes four ports 38 arranged symmetrically around the circumference of the regulator body 36 and located on the exterior surface of the regulator body and spaced along the exterior surface of the body. The ports are for connections to the input to the pressure building regulator (inlet port), the output of the final line regulator (outlet port), a gauge port, and a combined pressure building regulator outlet and final line regulator inlet port (combined inlet and outlet port).

The inlet port for the pressure building regulator will be connected to and in fluid communication with the pressure building coil inside of the cylinder. The combined pressure building regulator outlet and final line regulator inlet port (combined inlet and outlet port) will be connected to and in fluid communication with the vapor space or head space within the cylinder. A pressure gauge can be connected to the gauge port to monitor the pressure of the final line regulator. The gauge port is in fluid communication with the output portion of the final line regulator. The final line regulator outlet port will be connected to the downstream process that utilizes the gas from the cylinder. A bulk storage system that includes the combination regulator 30 can further include additional shut off valves in-line with the ports as shown schematically in FIG. 1, for example to isolate one or both of the regulators 32, 34.

Figure 5:
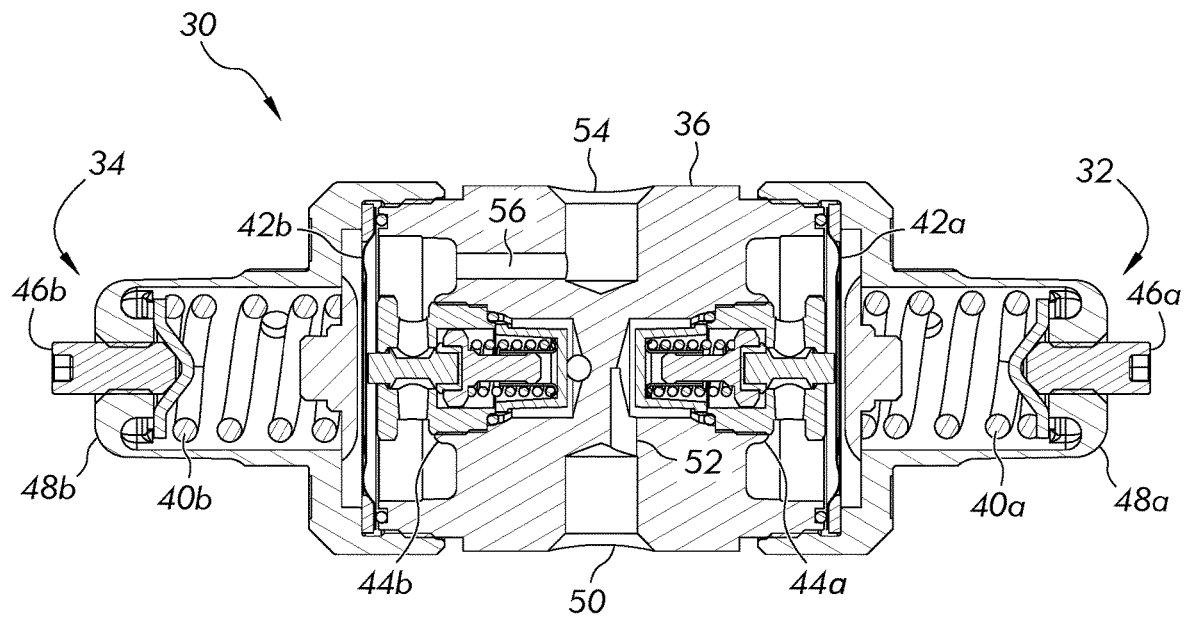
FIG. 5 is a cross-sectional view of the combination pressure building regulator and final line regulator.
Figure 6:
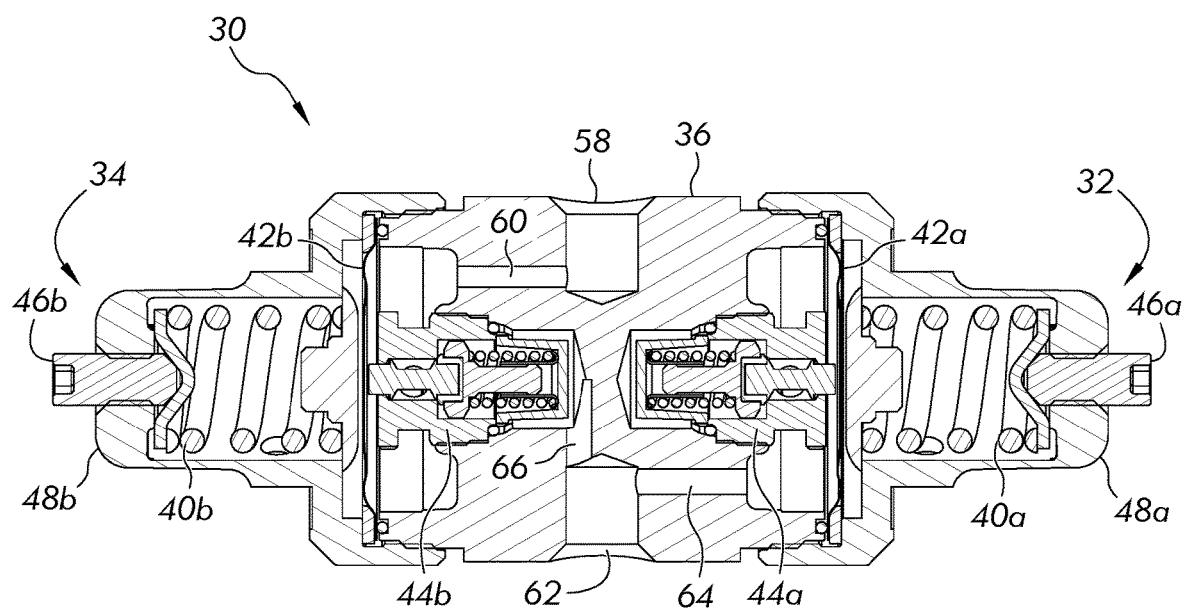
FIG. 6 is a cross-sectional view of the combination pressure building regulator and final line regulator.

Cross-sections of the combination pressure building regulator and final line regulator 30 are shown in FIGS. 5 and 6. It can be seen that the pressure building regulator 32 and the final line regulator 34 are similarly constructed. Each includes a spring 40a, 40b, a diaphragm 42a, 42b, and a valve assembly 44a, 44b attached to a respective diaphragm. The operations of the valve assemblies 44a, 44b are controlled by the corresponding regulator's pressure setpoint as established by the springs 40a, 40b and diaphragms 42a, 42b. The valve assemblies 44a, 44b are attached to and movable by their respective diaphragms 42a, 42b. The springs 40a, 40b are biasing members that apply a bias force against the diaphragms 42a, 42b, which tends to open the valves 44a, 44b when the regulated output pressures are less than the respective pressure setpoints. The respective pressure setpoints of the pressure building regulator 32 and the final line regulator 34 can be adjusted by screws 46a, 46b, which adjust the spring loads on the diaphragms 42a, 42b. Each regulator 32, 34 includes a bonnet 48a, 48b attached to the body 36. The bonnets 48a, 48b extend from opposite axial ends of the regulator body 36. The bias springs 40a, 40b are located within the bonnets 48a, 48b, and the bonnets cover the springs and diaphragms. The adjusting screws 46a, 46b extend through the bonnets 48a, 48b. The operation of diaphragm pressure regulators is known and need not be discussed in detail herein.

The inlet port 50 of the combination regulator 30 can be seen in FIG. 5. The inlet port 50 is in fluid communication with an input portion of the pressure building regulator 32 via an internal fluid channel 52 within the regulator body 36. The internal fluid channel 52 connects the input portion of the pressure building regulator 32 at the valve assembly 44a to the inlet port 50, which is connected to the pressure building coil on the cryogenic cylinder.

The outlet port 54 of the combination regulator 30 can also be seen in FIG. 5. The outlet port 54 is in fluid communication with an output portion of the final line regulator 34 via an internal fluid channel 56 within the regulator body 36. The internal fluid channel 56 connects the output portion of the final line regulator 34 at the downstream side of the valve assembly 44b to the outlet port 54, which is connected to a downstream processes that utilizes the stored gas.

The gauge port 58 of the combination regulator 30 can be seen in FIG. 6. The gauge port 58 is in fluid communication with the output portion of the final line regulator 34 via an internal fluid channel 60 within the regulator body 36. The internal fluid channel 60 connects the output portion of the final line regulator 34 at the downstream side of the valve assembly 44b to the gauge port 58. A pressure gauge can be connected to the gauge port 58 for monitoring the pressure of the gas supplied to the downstream process. The diameter of the internal fluid channel 60 that connects the output portion of the final line regulator 34 to the gauge port 58 can be the same as the internal fluid channel 56 that connects the output portion of the final line regulator to the outlet port 54, or the internal fluid channels 56, 60 can have different diameters. In the embodiment shown in the figures, the diameter of the internal fluid channel 60 that connects the output portion of the final line regulator 34 to the gauge port 58 is smaller than the diameter of the internal fluid channel 56 that connects the output portion of the final line regulator to the outlet port 54.

The combined inlet and outlet port 62 of the combination regulator 30 can be seen in FIG. 6. The combined inlet and outlet port 62 is in fluid communication with both of the output portion of the pressure building regulator 32 and the input portion of the final line regulator 34. It can be seen that the output portion of the pressure building regulator 32 is in fluid communication with the input portion of the final line regulator 34 within the regulator body 36. In the embodiment shown in the figures, the regulator body 36 includes respective internal fluid channels 64, 66 that connect the combined inlet and outlet port 62 to the output portion of the of the pressure building regulator 32 (at the downstream side of the valve assembly 44a) and the input portion of the final line regulator 34 (at the upstream side of the valve assembly 44b). The pressure building regulator 32 regulates the pressure of the gas in the head space of the cylinder, and the final line regulator 34 receives gas from the head space/pressure building regulator 32 and regulates the supplied gas pressure to a downstream process. Although FIG. 6 shows separate internal fluid channels 64, 66 extending from the regulators 32, 34 to the combined inlet and outlet port 62, the regulator body 36 could include an internal fluid channel that directly connects the output portion of the pressure building regulator 32 to the input portion of the final line regulator 34, so that the two regulators are in fluid communication with each other.

The combination pressure building regulator and final line regulator 30 can be used on systems for delivering various cryogenic gasses. However, in a particular embodiment, the combination regulator 30 is designed for use on $CO_2$ cylinders used in the food and beverage industry for example. The combination regulator 30 can meet food and beverage use requirements promulgated by a standards-issuing organization, such as a government entity or other organization (e.g., NSF International). To that end, the combination regulator 30 does not expose the process gas that is discharged to a downstream process to any components that may contain lead.

The pressure building regulator 32 will control and limit the head pressure of the $CO_2$ cylinder. When the valve 44a opens, liquid $CO_2$ flows from the cylinder and through the cylinder's pressure building coil. Liquid and/or gas $CO_2$ is pushed into the input side or input portion of the pressure building regulator 32 through its inlet port 50. The pressure regulating valve 44a and spring-loaded diaphragm 42a control the head pressure of the cylinder. Liquid and/or gas $CO_2$ enters the pressure building regulator 32, is regulated to a specific pressure through the regulator, and the outlet of the pressure building regulator allows gaseous $CO_2$ to enter the headspace or vapor space of the cylinder to maintain a constant head pressure. If the pressure building regulator's pressure setting is increased (by compressing the spring 40a), the head pressure of the cylinder will be increased. Likewise, if the pressure building regulator's pressure setting is decreased (by reducing the spring's 40a compression), the head pressure of the cylinder will be decreased. An example pressure range for the pressure building regulator 32 is 120-130 PSI, although other pressure ranges are possible.

The final line regulator 34 takes the output pressure from the pressure building regulator 32 and regulates this down to a usable level for a downstream process. An example pressure range for the output of the final line regulator 32 is 110-115 PSI, although other pressure ranges are possible. The output pressure of the pressure building regulator 32 is the input pressure to the final line regulator 34 (and also the head pressure of the cylinder). The outlet port 62 on the regulator body 36 for the pressure building regulator 32 is shared as the inlet port for the final line regulator 34. Thus, the regulator body 36 includes the combined inlet and outlet port 62. The output side or output portion of the pressure building regulator 32 is in fluid communication with the input side or input portion of the final line regulator 34, and in fluid communication with the combined inlet and outlet port 62, through the internal fluid channels 64, 66.

The regulator body 36 can be made from aluminum barstock, anodized and cleaned for oxidizing gas service per CGA G-4.1. The combination regulator 30 can include 300 series stainless steel diaphragms for both the pressure building side and the final line regulator side. The valve seats and seal can be made from virgin PTFE which will be compatible with cryogenic temperatures. All internal wetted components can be either lead-free or electroless nickel plated with 100% coverage to insure the gas does not contact any leaded material. The various ports and internal passages can be sized so as not to restrict the required flow of gas out of the cylinder or the time to build the head pressure internally. The bonnets 48a, 48b can be constructed from zinc die cast, chrome plated. The springs 40a, 40b and pressure adjusting screws 46a, 46b do not come in contact with the gas and can be constructed of materials which perform the required function. Diaphragm seals can be made from VITON material. The ports on the regulator body can be ¼ inch NPT (national pipe taper).

It should be evident that this disclosure is by way of example and that various changes may be made by adding, modifying or eliminating details without departing from the fair scope of the teaching contained in this disclosure. The invention is therefore not limited to particular details of this disclosure except to the extent that the following claims are necessarily so limited.

What is claimed is:

1. A combination pressure regulator, comprising:
   a regulator body having an inlet port on an exterior surface of the regulator body, an outlet port on the exterior surface of the regulator body, and a combined inlet and outlet port on the exterior surface of the regulator body;
   a first pressure regulator including a first diaphragm, a first valve assembly movable by the first diaphragm, and a first biasing member that applies a first bias force to the first diaphragm to establish a first pressure regulator setting;
   a second pressure regulator including a second diaphragm, a second valve assembly movable by the second diaphragm, and a second biasing member that applies a second bias force to the second diaphragm to establish a second pressure regulator setting different from the first pressure regulator setting,
   wherein an input portion of the first pressure regulator is in fluid communication with the inlet port, an output portion of the second pressure regulator is in fluid communication with the outlet port, and entirely within the regulator body both of an output portion of the first pressure regulator and an input portion of the second pressure regulator are in fluid communication with the combined inlet and outlet port.

2. The combination pressure regulator of claim 1, wherein the regulator body further includes a gauge port on the exterior surface of the regulator body, and wherein the output portion of the second pressure regulator is in fluid communication with the gauge port.

3. The combination pressure regulator of claim 2, wherein the inlet port, the outlet port, the combined inlet and outlet port, and the gauge port are arranged symmetrically around the regulator body.

4. The combination pressure regulator of claim 2, wherein the regulator body includes an internal fluid channel connecting the output portion of the second pressure regulator to the outlet port, and a further internal fluid channel connecting the output portion of the second pressure regulator to the gauge port, and wherein a diameter of the further internal fluid channel connecting the output portion of the second pressure regulator to the gauge port is smaller than a diameter of the internal fluid channel connecting the output portion of the second pressure regulator to the outlet port.

5. The combination pressure regulator of claim 1, further comprising a first bonnet extending from a first end of the regulator body, and a second bonnet extending from a second end of the regulator body opposite the first end, wherein the first biasing member is located within the first bonnet and the second biasing member is located within the second bonnet.

6. The combination pressure regulator of claim 5, wherein the first pressure regulator is axially aligned with the second pressure regulator along an axis of the regulator body.

7. A combination pressure regulator, comprising:
   a regulator body having an inlet port, an outlet port, and a combined inlet and outlet port spaced along an exterior surface of the regulator body;
   a first pressure regulator including a first diaphragm, a first valve assembly attached to the first diaphragm, and a first bias spring that applies a first bias force to the first diaphragm to establish a first pressure regulator setting;
   a second pressure regulator including a second diaphragm, a second valve assembly attached to the second diaphragm, and a second bias spring that applies a second bias force to the second diaphragm to establish a second pressure regulator setting different from the first pressure regulator setting,
   wherein an input portion of the first pressure regulator is in fluid communication with the inlet port, and an output portion of the second pressure regulator is in fluid communication with the outlet port, and
   wherein an output portion of the first pressure regulator is in fluid communication with an input portion of the second pressure regulator entirely within the regulator body.

8. The combination pressure regulator of claim 7, wherein both of the output portion of the first pressure regulator and the input portion of the second pressure regulator are in fluid communication with the combined inlet and outlet port.

9. The combination pressure regulator of claim 7, wherein the regulator body further includes a gauge port, and wherein the output portion of the second pressure regulator is in fluid communication with the gauge port.

10. The combination pressure regulator of claim 9, wherein the inlet port, the outlet port, the combined inlet and outlet port, and the gauge port are arranged symmetrically around the regulator body.

11. The combination pressure regulator of claim 9, wherein the regulator body includes an internal fluid channel connecting the output portion of the second pressure regulator to the outlet port, and a further internal fluid channel connecting the output portion of the second pressure regulator to the gauge port, and wherein a diameter of the further internal fluid channel connecting the output portion of the second pressure regulator to the gauge port is smaller than a diameter of the internal fluid channel connecting the output portion of the second pressure regulator to the outlet port.

12. The combination pressure regulator of claim 7, further comprising a first bonnet extending from a first end of the regulator body, and a second bonnet extending from a second end of the regulator body opposite the first end, wherein the first bias spring is located within the first bonnet and the second bias spring is located within the second bonnet.

13. The combination pressure regulator of claim 12, wherein the first pressure regulator is axially aligned with the second pressure regulator along an axis of the regulator body.

14. A combination pressure regulator, comprising:
   a regulator body having an inlet port, an outlet port, and a combined inlet and outlet port spaced along an exterior surface of the regulator body;
   a first pressure regulator including a first diaphragm, a first valve assembly movable by the first diaphragm, and a first biasing member that applies a first bias force to the first diaphragm to establish a first pressure regulator setting;
   a second pressure regulator including a second diaphragm, a second valve assembly movable by the second diaphragm, and a second biasing member that applies a second bias force to the second diaphragm to establish a second pressure regulator setting different from the first pressure regulator setting, wherein the regulator body includes:
- a first internal fluid channel connecting an input portion of the first pressure regulator to the inlet port,
- a second internal fluid channel connecting an output portion of the second pressure regulator to the outlet port,
- a third internal fluid channel connecting an output portion of the first pressure regulator to the combined inlet and outlet port, and
- a fourth internal fluid channel extending entirely within the regulator body from an input portion of the second pressure regulator to the combined inlet and outlet port.

15. The combination pressure regulator of claim 14, wherein the regulator body further includes:
- a gauge port; and
- a fifth internal fluid channel connecting the output portion of the second pressure regulator to the gauge port.

16. The combination pressure regulator of claim 15, wherein the inlet port, the outlet port, the combined inlet and outlet port, and the gauge port are arranged symmetrically around the regulator body.

17. The combination pressure regulator of claim 15, wherein a diameter of the fifth internal fluid channel connecting the output portion of the second pressure regulator to the gauge port is smaller than a diameter of the second internal fluid channel connecting the output portion of the second pressure regulator to the outlet port.

18. The combination pressure regulator of claim 14, further comprising a first bonnet extending from a first end of the regulator body, and a second bonnet extending from a second end of the regulator body opposite the first end, wherein the first biasing member is located within the first bonnet and the second biasing member is located within the second bonnet.

19. The combination pressure regulator of claim 18, wherein the first pressure regulator is axially aligned with the second pressure regulator along an axis of the regulator body.

* * * * *